(12) United States Patent
Chan

(10) Patent No.: US 10,673,681 B2
(45) Date of Patent: Jun. 2, 2020

(54) SYSTEM AND METHOD FOR ENABLING CROSS-DOMAIN COMMUNICATION OVER NETWORK

(71) Applicant: Charles Lap San Chan, Taipei (TW)

(72) Inventor: Charles Lap San Chan, Taipei (TW)

(*) Notice: Subject to any disclaimer, the term of this patent is extended or adjusted under 35 U.S.C. 154(b) by 516 days.

(21) Appl. No.: 15/460,214

(22) Filed: Mar. 15, 2017

(65) Prior Publication Data
US 2018/0270101 A1 Sep. 20, 2018

(51) Int. Cl.
*H04L 12/24* (2006.01)
*H04L 29/12* (2006.01)

(52) U.S. Cl.
CPC ......... *H04L 41/044* (2013.01); *H04L 61/15* (2013.01); *H04L 61/303* (2013.01); *H04L 61/1511* (2013.01)

(58) Field of Classification Search
CPC ........................................ H04L 41/044
See application file for complete search history.

(56) References Cited

U.S. PATENT DOCUMENTS

2017/0142060 A1* 5/2017 Thakar ............ H04L 61/10

* cited by examiner

*Primary Examiner* — Suraj M Joshi
(74) *Attorney, Agent, or Firm* — Cheng-Ju Chiang

(57) ABSTRACT

The present invention is directed to a system including multiple Management Units and Entities that connect to one or more Management Units, thereby establishing a cross-domain communication method. The Management Units function for storing, managing and assigning, or generating the Universal Identifications to each connected Entity. The functions performed by the Universal Identifications include resolving communication pathway and directly connect Entities over network.

14 Claims, 3 Drawing Sheets

Transmitting a command or request to a Management Unit by a sender Entity, wherein the command or request is related to a target Entity's information which is linked to a Universal Identification, and the Universal Identification is corresponding to the target Entity and is stored at the same Management Unit as the sender Entity.

Identifying and sending the Universal Identification of the target Entity is performed within the same Management Unit and the Universal Identification and communication information requested is sent to the sender Entity by the same Management Unit.

FIG. 2

SYSTEM AND METHOD FOR ENABLING CROSS-DOMAIN COMMUNICATION OVER NETWORK

FIELD OF THE INVENTION

The present invention relates to the communication field. In particular, embodiments of the present invention provide a cross-domain network communication between Domains and Entities over network utilizing a special character-based encoding rule, Hierarchy System and Domain Identifications and Entity Identifications resolution.

BACKGROUND OF THE INVENTION

Conventional telecommunication networks between entities rely on services provided by telecommunication carriers. Traditional carrier service providers have a horizontal peer relationship; each carrier can only manage its own numbering plans. When initiating an audio communication, the exact communication pathways and the destination of recipient depend on series of numbers dialed by the caller, for example, a combination of country, area and telephone numbers, which is used as phone number to uniquely represent a recipient and its location. The carries can only establish the connection by first examining each part of the phone number, and then establish connections to responsible entities accordingly. Thus, the connection can be successful, but to reach the designated recipient is completely relying on the correctness of the phone number.

Another form of communication is data communication, for example, domain name resolution system, it is a decentralized system, consists with groups of participate entities; each entity group is partially responsible to resolve a readable domain name for instance "www.google.com" into an IP address. The actual hierarchy structure is represented in the form of domain name separated by dots. The resolution is process in reverse direction begin with ".com". In the process of domain name resolution, each participate entity group only preforms a partial resolution which is separated by a dot, and then forward to next responsible group for next partial resolution, and keep on forwarding until the IP address is resolved. Thus, the resolution of single domain name relies on multiple entities scattered on the network, the resolution request is passed around numbers of entities or entity groups, but only the last entity has the complete knowledge of the IP address related to a specific domain name. Furthermore, the domain name resolution in each of domain categories is operated independently; for example, the ".com" and ".net" are two individual domain name resolution systems.

SUMMARY OF THE INVENTION

Embodiments of the present invention disclose solution to the aforementioned problems and disadvantages of the prior art. In accordance with the embodiments of the present invention, a Hierarchy System is introduced to connect multiple Domains and Entities. An identification rule is defined to specifically represent every single Domain and Entity in the network, and an Identity Mapping mechanism is described to integrate with conventional identification mechanisms, to enhance the readability and usability of Domain Identifications and Entity Identifications.

The terminologies used in the present invention:

Entity: An Entity can be a physical unit, a device with computation ability, or a logically defined unit.

Entity Identification: It is a specific name assigned to an Entity and the name is unique within a particular Domain.

Domain: A Domain consists of a group of Entities on related network.

Domain Identification: It is a specific name assigned to a Domain and the name is universally unique.

Universal Identification: It is a name combining Domain Identification and Entity Identification; therefore, it is universally unique.

Management Unit: It is used to construct Hierarchy System with Domains and Entities. It also manages, generates, assigns, and resolves Domain Identifications and Entity Identifications and their associated information.

Hierarchy System: The universal hierarchy system is constructed with a set of Management Units. The root Management Unit is responsible for generating Domain Identifications and Entity Identifications and distributes to descendant Management Units. A Management Unit manages connected Entities and direct descendant Management Units on a Network. The parent Management Unit holds the Domain Identifications and Entity Identifications and their associated information for its descendant Management Unit(s).

Identity Mapping: To map a Universal Identification with one or more existing known names like IP Address, Email Address, PSTN telephone number, etc.

Network: It is a system of interconnected or interrelated Entities, Domains, and Management Units.

In the present invention, a top down Hierarchy System with unlimited branching is defined, the Hierarchy System consists of numbers of Management Units and Entities. Each Management Unit in the system is responsible of managing, assigning, distributing, and resolving the unique identifications of the direct descendant Management Units and Entities. Furthermore, the root Management Unit in the hierarchy is responsible to generate all identifications and assign these identifications to all Management Units and Entities in the network.

According to the above-mentioned Hierarchy System a vertically dependent relationship between each level of Management Unit(s), where the root Management Unit generates and manages volume of Universal Identifications, and this root Management Unit is responsible for assigning these identifications to the lower descendent Management Unit(s) and direct connected Entities when requested. Furthermore, each $2^{nd}$ tier Management Unit manages and assigns Domain Identifications and Entity Identifications to the direct connected Entities and $3^{rd}$ tier descendent Management Units, and so on. The above-mentioned Hierarchy System can expand indefinitely both downward vertically and horizontal directions begin with the root Management Unit.

These embodiments further set up a new system that includes Universal Identifications, which comprises at least one special character and series of alphanumeric characters as unique Domain Identifications for each connected Management Unit, follow by series of alphanumeric characters as Entity Identifications for each Entity connected to the Domains in network.

In accordance with the embodiments of the above-mentioned Universal Identification, a Domain Identification consists of at least one or more special character prefix, the prefix can be a symbol(s) or non-alphanumeric character(s) such as @, #, $, %, &, * and +, and the rest of the identification can be a string of alphanumeric character(s), for example, "*ABC4567112". This Domain Identification is universally unique.

In accordance with the embodiments of the above-mentioned, an Entity Identification consists of a string of alphanumeric character(s). This Entity Identification is only unique within an associate Domain.

In accordance with the embodiments of the above-mentioned, a Universal Identification comprises a Domain Identification and an Entity Identification. Therefore, it is universal unique.

In accordance with the embodiments of the present invention, the Universal Identifications are used to establish cross-domain communication, with help from the Management Units resolution capacity.

Another embodiment provides an Identity Mapping mechanism associates existing identifications such as domain name, IP address, email address, location or telephone numbers with an individual Entity or a Universal Identification in various applications. In the present invention, each of Domain Identification and Universal Identification is mapped with those conventional identifications upon assignment. This information binds with a Universal Identification, and it is stored in one or more Management Unit(s); this collective information could be used for searching criteria to identify and find a Universal Identification across the network, and vice versa.

Another embodiment provides a method for establishing communication between two Entities in the network by requesting the target Entity's location, address and access method(s) (access information) via associated Management Unit(s) with Universal Identifications as searching parameter with following steps:
1. An initiator Entity (sender) sends a request to the associated Management Unit with its Universal Identification and its target Entity's Universal Identification.
2. The Management Unit would provide the target Entity's access information if the Unit holds the information; else the request is passed to the Unit's parent Management Unit, until such request is being resolved.
3. The resolved information is passed back to the sender.

Another embodiment provides a method for establishing communication between two Entities in the network by requesting the target Entity's Universal Identification, location or address and access method(s) (access information) via associated Management Unit(s) with the targeted Entity's existing identification name(s) as searching parameter with following steps:
1. An initiator Entity (sender) sends a request to the associated Management Unit with its existing identification name(s) and its target Entity's existing identification name(s).
2. The Management Unit would provide the target Entity's Universal Identification or other associated information if the Unit holds the information; else the request is passed to the Unit's parent Management Unit, until such request is being resolved.
3. The resolved Universal Identification or associated information is passed back to the sender.

According to the above-mentioned system and method, a Domain or Entity has at least one identity, which is stored in at least one Management Unit, and it is corresponding to a Domain Identification or Universal Identification.

Furthermore, at least one of the Management Units in the network can resolve any given Universal Identifications, Domain Identifications or its associated information. Wherein, the Universal Identifications or Domain Identifications resolution can be used for locating or communicating directly with prior unknown Domains or Entities in the network.

Wherein, the information associate to Universal Identification or Domain Identification can also be used for locating or communicating directly with prior unknown Domains or Entities.

Additional features and advantages of embodiments of the present invention will become more readily apparent from the following discussion, particularly when taken together with the accompanying drawings.

BRIEF DESCRIPTION OF THE DRAWINGS

FIG. 2 is a flow chart illustrating aspects of the operation of communication within the same Management Unit in accordance with embodiments of the present invention.

DETAILED DESCRIPTION OF THE INVENTION

The present invention directed to a system including multiple Management Units that connect with each other and their Entities, thereby establishing the cross-domain communication network. As used herein, Management Units used for storing, managing, generating, and assigning the Universal Identifications. The functions performed by the present invention include the generating of Universal Identifications, distributing, and managing of Universal Identifications, searching, and locating Universal Identifications.

Figure 1:
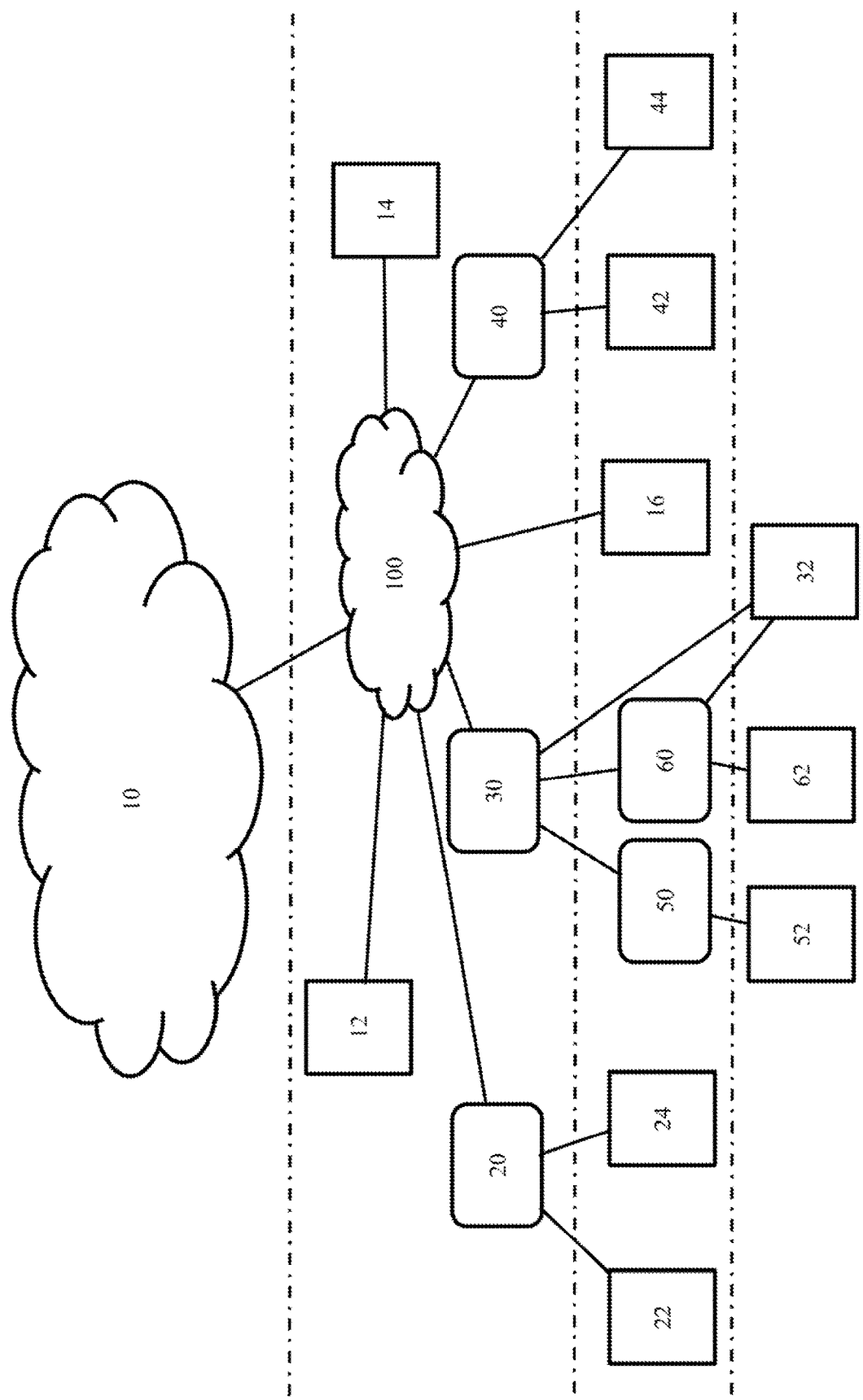
FIG. 1 is a diagram illustrating the communication networks of the present invention.

With reference to FIG. 1, it shows the components of the Hierarchy System in accordance with embodiments of the present invention. In particular, the system includes multiple Management Units 10, 20, 30, 40, 50, 60, and Entities 12, 14, 16, 22, 24, 32, 42, 44, 52, 62. The communication pathway may base on the internet 100 for example.

In FIG. 1, Management Units 10, 20, 30, 40, 50, 60 form a hierarchical relationship in which Management Unit 10 is the top most $1^{st}$ tier Management Unit; Management Units 20, 30, 40 are the $2^{nd}$ tier Management Units; and Management Units 50, 60 are the $3^{rd}$ tier Management Units. The $1^{st}$ tier Management Unit 10 may generate, store, arrange, and assign all Universal Identification to the $2^{nd}$ tier Management Units 20, 30, 40, the $3^{rd}$ tier Management Units 50, 60, and the direct connected Entities 12, 14, 16.

The $2^{nd}$ tier Management Unit 20 may store, arrange, and assign all Universal Identifications to the connected Entities 22, 24, which are assigned by its parent Management Unit 10. The $2^{nd}$ tier Management Unit 30 may store, arrange, and assign all Universal Identifications to the $3^{rd}$ tier Management Units 50, 60, and the direct connected Entity 32, which are assigned by its parent Management Unit 10. The $2^{nd}$ tier Management Unit 40 may store, arrange, and assign all Universal Identifications to the connected Entity 42, 44, which are assigned by its parent Management Unit 10.

The $3^{rd}$ tier Management Unit 50 may store, arrange, and assign Universal Identifications to the connected Entity 52, which are assigned by its parent Management Unit 30. The $3^{rd}$ tier Management Unit 60 may store, arrange, and assign Universal Identifications to the connected Entity 32, 62, which are assigned by its parent Management Unit 30. The Entity 32 connects with two Management Units 30 and 60, that means the Entity 32 receives one Universal Identification from each Management Unit 30 and 60, in this case, the Entity 32 is associated with two Management Units with services provided by those Management Units.

In the present system, the 1$^{st}$ tier Management Unit 10 has more influence than other Management Units, the 2$^{nd}$ tier Management Unit 20, 30, and 40 has more influence than 3$^{rd}$ tier Management Units 50, 60. Each Management Unit can have multiple descendants, but can have one or more direct ascendant parents, for example, the lower Management Unit 50, its direct parent is the 2$^{nd}$ tier Management Unit 30. However, the 2$^{nd}$ tier Management Unit 30 may manage at least one descendent Management Unit, such as the 3$^{rd}$ tier Management Units 50 and 60. The 2$^{nd}$ tier Management Units 20, 30 and 40 would not have knowledge of others and their descendants' Universal Identification assignment, and the 3$^{rd}$ tier Management Units 50 and 60 would not have knowledge of others and their descendants' Universal Identification assignment, too. The levels of hierarchy are not limited as illustrated in FIG. 1. One Entity may connect to at least one Management Unit, as in Entity 32. The amounts of Management Units or Entities are not limited, but should follow the above hierarchy rules.

As one embodiment, the resolution of prior unknown Management Units or Entities connect to those Management Units will be provided by the ascendant parent Management Unit. As illustrated in FIG. 1. The 1$^{st}$ tier Management Unit 10 provide the identification resolution to 2$^{nd}$ tier Management Units 20, 30 and 40. The 2$^{nd}$ tier Management Unit 30 provide same identification resolution service to the descendant 3$^{rd}$ tier Management Units 50, and 60.

As one embodiment, the 1$^{st}$ tier Management Unit 10 may be a cloud server which comprises storage and computation devices. The 2$^{nd}$ tier Management Units 20, 30, 40 may be local servers reside in each domain. The 3$^{rd}$ tier Management Unit 50 or 60, may comprise the subscriber identity module cards (SIM card) and storage devices. The above Entities can be a physical unit, a device with computation ability, or a logically defined unit.

One point of the hierarchy rules is at least one or more Universal Identifications are assigned and managed by one or more Management Units participating in the network. As the 1$^{st}$ tier Management Unit 10 with a system wide unique Domain Identification, and one or more Entities 12, 14, 16 are connecting to it. Additionally, each Entity 12, 14, 16 associated with 1$^{st}$ tier Management Unit 10 has one or more Universal Identifications, and the Universal Identifications are composed of at least one special character, a Domain Identification managed by the 1$^{st}$ tier Management Unit and an Entity identification assigned by 1$^{st}$ tier Management Unit 10. The 1$^{st}$ tier Management Unit 10 is used for storing and manage all Domain Identifications of descendant Management Units and Universal Identifications assigned to its associated Entities, illustrated in FIG. 1. The Domain Identification of 2$^{nd}$ tier Management Units 20, 30, 40 and 3$^{rd}$ tier Management Units 50, and 60, and each Entity's Universal Identifications 12, 14, 16, 22, 24, 32, 42, 44, 52 and 62 are managed by the 1$^{st}$ tier Management Unit.

The 2$^{nd}$ tier Management Units 20, 30, or 40 each with at least one system wide Domain Identification, connecting to the 1$^{st}$ tier Management Unit 10 and one or more connected Entities 22, 24, 32, 42, or 44. Each connected Entity 22, 24, 32, 42, or 44, has a Universal Identification, and the Universal Identifications are composed of at least one special character, the Domain Identification, which it connected to, and an Entity identification assigned by its connected 2$^{nd}$ tier Management Unit. The 2$^{nd}$ tier Management Units 20, 30, or 40 which are responsible for storing the collection of Domain Identifications and assigning the Universal Identification to the connected Entities 22, 24, 32, 42, or 44.

The 3$^{rd}$ tier Management Units 50 or 60 with a Domain Identification, connecting to the 2$^{nd}$ tier Management Unit 30 and one or more Entities 32, 52, or 62. Each Entity 32, 52, or 62, has a Universal Identification, and the Universal Identification is composed of at least one special character, the 3$^{rd}$ tier Domain Identification, and an Entity identification. The 3$^{rd}$ tier Management Units 50 or 60 are used for storing the Universal Identifications and assigning the Universal Identification to Entities 32, 52, or 62. Entity 32 is connecting to both Management Unit 30 and 60, and having corresponding Universal Identification assigned by each Management Unit.

The Management Units are not only functioning for storing one or more Domain Identification and Universal Identifications, but also storing related information which is associated to each Domain Identification and Universal Identification, information such as representative lines, accounts, identification numbers, email addresses, location, domain name, and so on. The aforementioned items are corresponding to at least one identity, both identifications and associated information can be used in identity resolution. For instance, in an identity resolution process, An Domain Identification or Universal Identifications is given as search criteria the associate information is returned. If one of the associated information is given as search criteria the corresponding Domain Identification or Universal Identification is replied.

In the aforementioned, any Entity may have connected to one or more Management Units, and can have one or more Universal Identifications assigned by each Management Unit.

Each of the Universal Identifications may be composed of at least one special character as the beginning symbol, for example, the at least one special character could be asterisk "*", hashtag "#", or other symbols that are commonly known, which followed by the Domain Identification and alphanumeric Entity identification. To establish a connection between Entities a resolution of Universal Identification must be perform by direct parent Management Unit. If prior to the establishment of communication, the target Entity's Universal Identification access information is known, then the process of resolution of the Universal Identification can be bypassed.

The Universal Identifications are composed of at least one special character, a Domain Identification and followed by an Entity Identification. Both the Domain Identification and Entity Identification are permutation or combination of alphanumeric characters, for example, *ABC4567112. Wherein the special character is "*", the Domain Identification is "ABC4", which identifies the Entity's connected Management Unit, the Entity identification "567112" is the identification of the Entity, which only unique within that particular Domain.

In the present invention, a network wide unique Domain Identification is used to identify a Domain and a Domain wide unique Entity Identification is assigned to an Entity. Therefore, an Entity with a Universal Identification consists of Domain Identification and Entity Identification is a network wide unique identification.

With reference to FIG. 2, an operation method based on the aforementioned system for Universal Identification or Domain Identification resolution, comprising: transmitting a request to direct ascendant Management Unit by a sender Entity or Management Unit, for example, the Entity 12. The request is related to a target Entity's information, which is associated to a Universal Identification and is stored at a Management Unit, for example, the 1$^{st}$ tier Management Unit 10. The Universal Identification is corresponding to the target Entity, for example, the Entity 14, as illustrated in FIG. 1, both Entity 12 and Entity 14 are connected to the same Management Unit 10, so the target Entity's Universal Identification and associated information are also stored at the Management Unit 10.

As illustrated in FIG. 1 both sender and target Entity are connecting to the same Management Unit 10, the resolution of target Universal Identification involving the mapping mechanism is performed within the Management Unit 10. The result of mapping mechanism is return with the Universal Identification of the target Entity 14, it is send back to the sender Entity 12 by Management Unit 10.

In this embodiment, the Universal Identification is composed of at least one special character, a Domain Identification assigned to or managed by the 1$^{st}$ tier Management Unit 10, namely the Domain Identification, and an Entity identification of the target Entity 14, namely the Entity identification.

The information may include but not limit to a representative line, domain name, phone number, IP address, location or email address.

Figure 3:
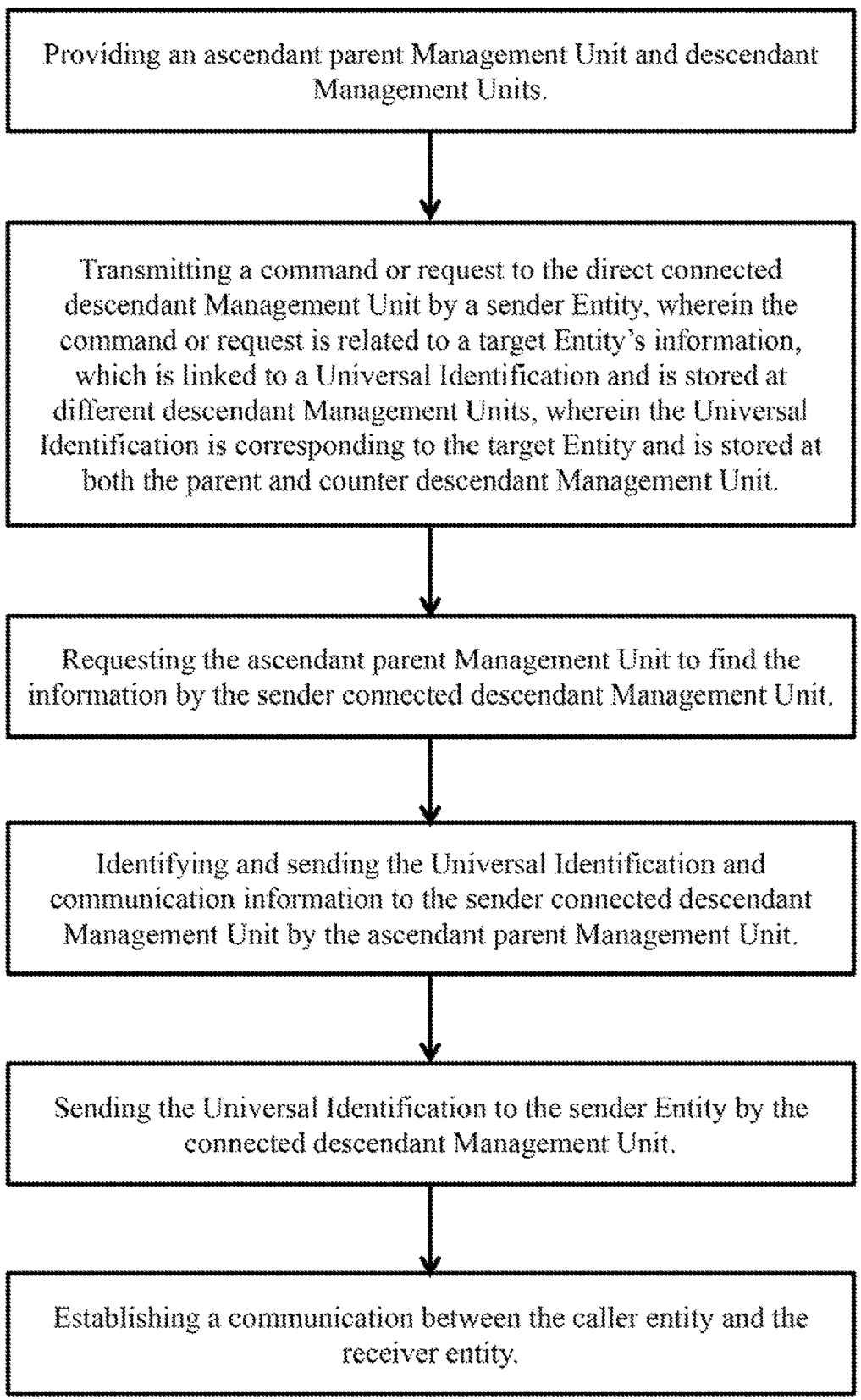
FIG. 3 is a flow chart illustrating aspects of the operation of communication across multiple domains in a Hierarchy System in accordance with embodiments of the present invention.

With reference to FIG. 3, an operation method based on the aforementioned system especially for direct cross domain communication over network, comprising: providing an 2$^{nd}$ tier Management Unit and a 3$^{rd}$ tier Management Unit, for example, the 2$^{nd}$ tier Management Unit 30 and the 3$^{rd}$ tier Management Unit 50.

Transmitting a command or request to the 3$^{rd}$ tier Management Unit 50 is provided by a sender Entity, for example Entity 52. The command or request for target Entity 62 is related to a target Entity's information, which is linked to a Universal Identification, as previous described hierarchy structure of the system, the information is stored at Management Unit 60 of the 3$^{rd}$ tier and the parent Management Units 30 of the 2$^{nd}$ tier, which the target Entity is directly connecting to.

As illustrated in FIG. 1, the sender Entity 52, and target Entity 62 are connecting to two separate Management Units 50 and 60, the resolution of target Universal Identification involving the mapping mechanism is performed by first the 3$^{rd}$ tier Management Unit 50, which the result will be inconclusive. Since it is not the associated Management Unit, which target Entity 62 is connecting to, the request is send upward to the parent Management Unit 30 by Management Unit 50 for further Universal Identification resolution. The Management Unit 30 is the parent Management Unit of Management Unit 60, so the request can be resolved by Management Unit 30, the result of the Universal Identification is send back to Management Unit 50, and continually forward it back to the sender Entity 52.

In this embodiment, the Universal Identification is composed of at least one special character, a Domain Identification managed by the 2$^{nd}$ tier Management Unit 30, namely the Domain Identification, and an Entity Identification of the target Entity 62, namely the Entity Identification.

The information may include but not limit to a representative line, domain name, phone number, IP address, location or email address.

As one embodiment, an operation method based on the aforementioned system for direct communication cross domain over network, comprising: providing a relative ascendant Management Unit and a relative descendant Management Unit, for example, the 1$^{st}$ tier Management Unit 10 and the 2$^{nd}$ tier Management Unit 40.

Transmitting a command or request to the relative descendant Management Unit is provided by a sender Entity, such as the Entity 42. Thus, the command or request is related to a target Entity's information, which is linked to a Universal Identification and is stored at the relative ascendant Management Unit 10, and the Universal Identification is corresponding to the target Entity, for example, the Entity 62 and is stored at the 1$^{st}$ tier Management Unit 10. In this case, the relative descendant Management Unit 40 does not have any information of the Entity 62.

Therefore, requesting the relative ascendant Management Unit 10 to find the information which is sent by the relative descendant Management Unit 40; identifying and sending the Universal Identification to the relative descendant Management Unit 40 by relative ascendant Management Unit 10; sending the Universal Identification to the sender Entity 42 by the relative descendant Management Unit 40. It shows a relative management concept of the hierarchical rule and performs the cross-domain communication network.

In this embodiment, each of the Universal Identifications includes at least one special character as the beginning symbol followed by Domain Identification and Entity identification, this systematic identification rule is to simplify and increase the efficiency of Universal Identification resolution. Thus, a responsible Management Unit can easily be identified, for each Management Unit during the Universal Identification resolution process, the responsible Management Unit of the target Entity' can be determined by checking the Domain Identification against its managed Domain Identifications. If a match is found, the complete Universal Identification resolution is performed, if no match is found, the request is sent to the parent Management Unit for further process.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention.

What is claimed is:

1. A system for enabling cross-domain communication over network, comprising:
    numbers of interconnected Management Units via network forming a hierarchical management structure;
    the Management Units with one or more Domain Identifications, connecting to one or more Management Units and/or Entities;
    wherein the Management Units can be assigned and manage one or more Domain Identifications and Universal Identifications;
    wherein each of the Universal Identifications include at least one special character as a beginning symbol followed by the Domain Identifications and an Entity identification;
    wherein the Management Units are combination of cloud servers and local servers, and the Entities are devices;
    each Entity is assigned with one or more Universal Identifications by the connecting Management Units, wherein the Universal Identifications are composed of at least one special character, the Domain Identification, and the Entity identification;
    the Management Units are responsible for storing the Universal Identifications and assigning the Entities with the Universal Identifications; and wherein one or more descendant Management Units of the Management Units are connecting to one or more ascendant parent Management Units of the Management Units; and the Domain Identification and the Universal Identifications of the descendant Management Units are assigned by the ascendant parent Management Units.

2. The system of claim 1, further comprising: one upper most $1^{st}$ tier Management Unit in a hierarchy network with a collection of all Domain Identifications and associated Entity Identifications, connecting to the descendant Management Units and/or Entities.

3. The system of claim 2, wherein the descendant Management Units of the $1^{st}$ tier Management Unit with the Domain Identifications and associated the Entity Identifications assigned by the ascendant parent Management Unit connecting to the $1^{st}$ tier Management Unit and one or more Entities.

4. The system of claim 3, wherein each Entity has one or more Universal Identifications, and the Universal Identification is composed of at least one special character, the Domain Identification of connecting the ascendant parent Management Unit, and an associated Entity Identification.

5. The system of claim 4, wherein the Management Units are responsible for storing, resolving the Universal Identifications and assigning the Entity Identifications and the Domain Identifications.

6. The system of claim 5, further comprising: one or more descendant Management Units of the $2^{nd}$ tier Management Unit, assigned with one or more Domain Identifications, connecting to the direct ascendant parent Management Unit and one or more Entities.

7. The system of claim 6, wherein the descendant Management Units of $3^{rd}$ tier Management Units are responsible for storing, resolving the Universal Identifications and assigning the Entity Identifications and the Domain Identifications.

8. The system of claim 7, further comprising: wherein the level and numbers of the descendant Management Units are not limited, the structure of Management Unit network can be expanded in both horizontal and vertical direction when applicable.

9. A method for enabling same domain communication over network, comprising:
  transmitting a command or request to a Management Unit by a sender Entity, wherein the command or request is related to a target Entity's information which is linked to a Universal Identification, wherein the Universal Identification is corresponding to the target Entity and is stored at the same Management Unit as the sender Entity; and
  identifying and sending the Universal Identification of the target Entity is performed within the same Management Unit and the Universal Identification and communication information requested is sent to the sender Entity by the same Management Unit;
  wherein the Universal Identification include at least one special character as a beginning symbol followed by a Domain Identifications and an Entity identification.

10. The method of claim 9, wherein the Universal Identification is composed of the Domain Identification and the Entity Identification of the target Entity.

11. The method of claim 9, wherein the information comprises a representative line, an IP address, or email address which is originally used for identify the Entity.

12. A method for enabling cross-domain communication over network, comprising:
  providing an ascendant parent Management Unit and descendant Management Units;
  transmitting a command or request to the direct connected descendant Management Unit by a sender Entity;
  wherein the command or request is related to a target Entity's information, which is linked to a Universal Identification and is stored at different descendant Management Units;
  wherein the Universal Identification is corresponding to the target Entity and is stored at both the parent and counter descendant Management Unit;
  requesting the ascendant parent Management Unit to find the information by the sender connected descendant Management Unit;
  identifying and sending the Universal Identification and communication information to the sender connected descendant Management Unit by the ascendant parent Management Unit; and
  sending the Universal Identification to the sender Entity by the connected descendant Management Unit;
  wherein the Universal Identification include at least one special character as a beginning symbol followed by a Domain Identification and an Entity identification.

13. The method of claim 12, wherein the Universal Identification is composed of the Domain Identification and the Entity Identification of the target Entity.

14. The method of claim 12, wherein the information comprises a representative line, an IP address, or email address which is originally used for identify the Entity.

* * * * *